March 12, 1929.  W. VON NEUDECK  1,705,275
AUTOMATIC QUICK CHANGE DRILL CHUCK
Filed April 21, 1924   2 Sheets-Sheet 1
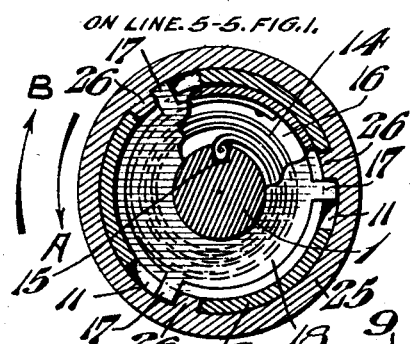
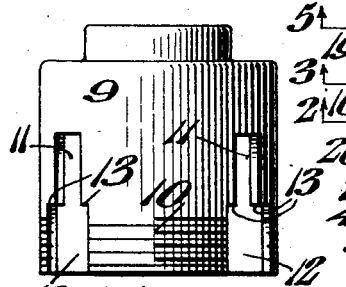
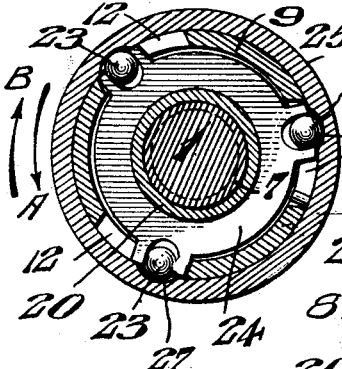
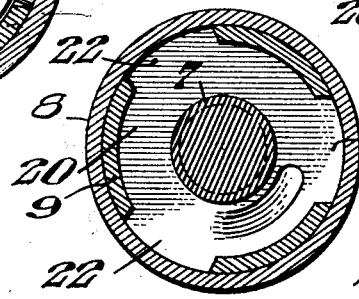
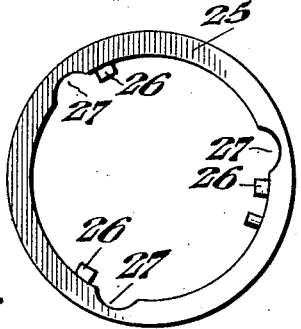
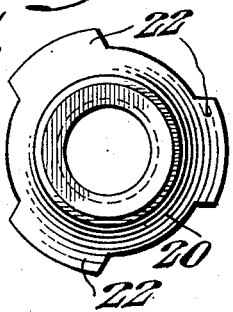
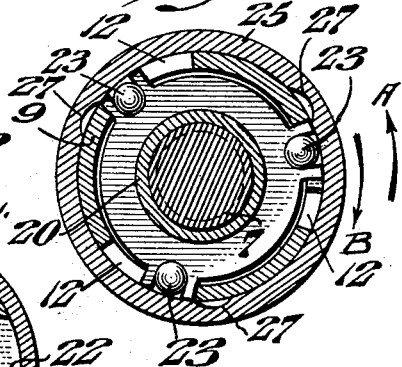
INVENTOR
Wilhelm von Neudeck
BY
ATTORNEYS March 12, 1929. W. VON NEUDECK 1,705,275
AUTOMATIC QUICK CHANGE DRILL CHUCK
Filed April 21, 1924 2 Sheets-Sheet 2
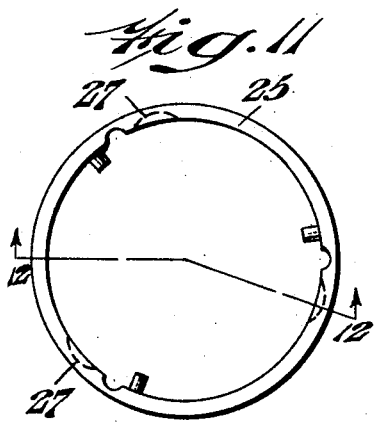
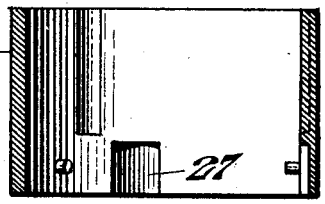
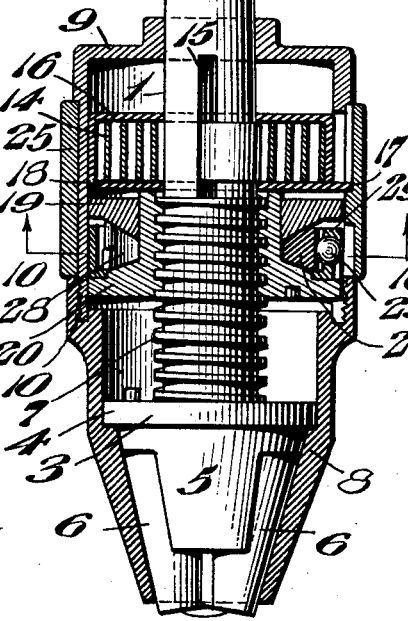
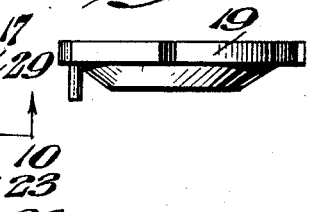
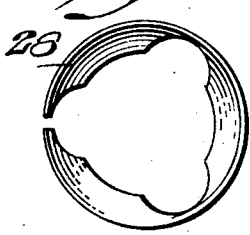
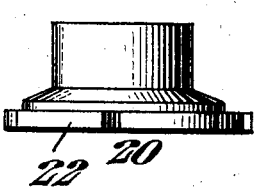
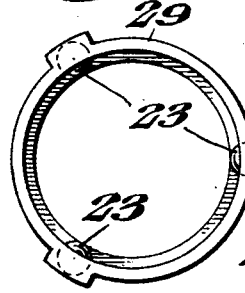
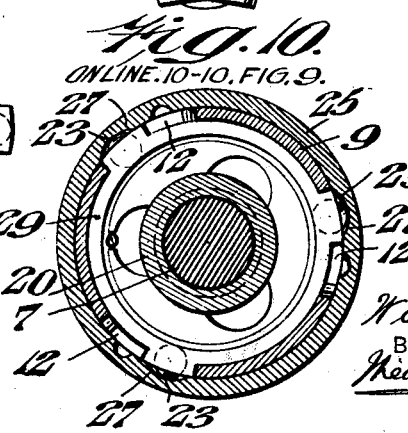
INVENTOR:
Wilhelm von Neudeck.
BY
ATTORNEYS.

Patented Mar. 12, 1929.

1,705,275

UNITED STATES PATENT OFFICE.

WILHELM von NEUDECK, OF PHILADELPHIA, PENNSYLVANIA.

AUTOMATIC QUICK-CHANGE DRILL CHUCK.

Application filed April 21, 1924, Serial No. 707,805, and in Germany April 24, 1923.

My invention relates to a type of drill chuck known as a "quick change" drill chuck which has for its main object the insertion of a drill into the chuck and the operative engagement of the same by the chuck, as well as the subsequent removal of the drill from the said chuck without the aid of any key, wrench or other additional locking device, and while the chuck is revolving.

Chucks of this type have been known heretofore and depended for their gripping action on some wedging mechanism which closed automatically and became tighter as the drill was turned. In order to release the drill and thus permit its removal from the chuck the wedging force of the chuck had to be overcome by some manual operation; usually the grasping of and holding stationary some part of the revolving chuck, while the remaining parts continued to rotate.

These prior "quick change" drill chucks possessed the disadvantage however, that when the drill was subjected to a great torque, as when cutting fast, or upon continued use of a drill, the same would be wedged in the chuck so tight that its release and subsequent removal from the chuck became practically impossible by the usual manual operation mentioned above.

In the novel drill chuck embodying my invention, the above disadvantage is eliminated by a novel construction, whereby the wedging force of the chuck is first released by a trigger mechanism, and the chuck is thereafter opened sufficiently to permit the ready removal of the drill.

With the above end in view my novel quick change drill chuck consists of a conical wedging shell containing three conical clamping elements, and a pressure screw mechanism adapted to force the three conical clamping elements into the conical shell and thereby cause the said clamping elements to operatively engage the shank of the drill located centrally of said elements.

My invention consists more particularly however of a novel construction in said pressure screw mechanism, whereby the force of the screw may be relieved by a slight turning of an operating sleeve on the outer periphery of the body of the chuck in a direction opposed to the normal direction of rotation of the chuck while in operation.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a view in elevation and partly in section of the novel quick change drill chuck embodying my invention.

Figure 2 represents a section on line 2—2 of Figure 1.

Figure 3 represents a section on line 3—3 of Figure 1, showing the operating sleeve in the releasing position.

Figure 4 represents a view similar to Figure 3 showing the operating sleeve in the locking position.

Figure 5 represents a section on line 5—5 Figure 1.

Figure 6 represents a view in elevation of the housing of the chuck.

Figure 7 represents a plan view of the operating sleeve.

Figure 8 represents a plan view of the threaded thrust plate.

Figure 9 represents a view in elevation and partly in section of a modified form of a novel quick change drill chuck embodying my invention.

Figure 10 represents a section on line 10—10 of Figure 9.

Figure 11 represents a plan view of the operating sleeve of the modified form of my invention.

Figure 12 represents a section on line 12—12 of Figure 11.

Figure 13 represents a detailed plan view of the thrust collar shown in Figure 9.

Figure 14 represents a detailed plan view of the ball race collar shown in Figure 9.

Figure 15 represents a detailed view in elevation of the upper beveled thrust plate shown in Figure 9.

Figure 16 represents a detailed view in elevation of the lower or threaded thrust plate shown in Figure 9.

Referring to the drawings, 1 designates the central stem of my novel quick change drill chuck, having any standard shank, such as the taper shank 2 at its upper end, and a head 3 at its lower end, integral with said stem, and comprising the wedging plate 4 and the three prongs 5 and adapted to retain the three conical clamping rollers 6 properly positioned relative to each other. The portion of the stem 1 adjacent the head 3 is threaded left handed as at 7, which screw portion 7, as will be described more in detail hereinafter, is adapted to press and wedge the three clamping rollers 6 into the conical wedging shell 8 against the shank of the drill located centrally between the three rollers.

The conical shell 8 is secured to the housing 9 of the drill chuck by means of the threaded portions 10, thus forming a rigid extension of said housing for the purposes of the mechanism to be described hereinafter. The housing 9 is provided with three equidistant slots in the cylindrical wall thereof each having an upper narrow portion 11, and a lower wide portion 12, and the ledges 13 at the juncture of each of narrow and wide portions respectively. Within the upper portion of the housing 9 is a flat helical spring 14 having its inner end engaging the stem 1 by means of the elongated recess 15 therein and having its outer end fixed to the spring casing 16, which casing in turn operatively engages the housing 9 by means of the three projections 17 integral with the lower or cover plate 18 of said casing, extending into the three narrow slots 11 respectively of the housing 9.

Below the spring casing 16 are located the two beveled plates 19 and 20 respectively of similar contour (as shown in Figure 8) and having the projections 21 and 22 respectively extending into the wide slots 12 of the housing 9 (Figures 1 and 2). The lower beveled plate 20 is provided with an internal thread corresponding to the thread of the pressure screw 7, which is thus adopted to receive said pressure screw and force the same downward towards the conical shell by the relative angular movement of the stem 1 and the housing 9. The counter pressure of the pressure screw 7 is thus received by the lower beveled plate 20, which in turn transmits the pressure to the upper bevel plate through the three steel balls 23 positioned relative to each other by the guide collar 24 and bearing against the inclined surfaces of the two beveled plates respectively (Figures 1, 3, and 4). The upper beveled plate 19 in turn bears against the ledges 13 of the housing 9.

The spring casing 16, beveled plates 19 and 20, and the conical wedging shell all being fixed with respect to any angular movement relative to each other, the spring 14 is so interposed between said housing and hence the beveled plate 20 and the stem 1 as to tend to turn said stem in the direction of the arrow B (Figure 1) relative to said beveled plate 20. Thus the spring 14 feeds the pressure screw 7 downward and causing the conical clamping rollers 6 to be wedged against the inner conical surface of the shell 8 and the shank of the drill (not shown) positioned centrally of the three clamping rollers 6. This causes an operative engagement between the rollers 6 and the shank of the drill. The rollers 6 being fixed relative to each other and relative to the head 3 by the prongs 5 of said head 3, any rotation of the drill relative to the chuck in the direction of the arrow A (as when the torque incident to the drilling operation causes the drill to "slip" in the chuck) will impart an opposed rotary movement to the shell 8 through the frictional engagement between the cylindrical shank of the drill, the rollers 6, and the inner conical surface of the shell 8. This opposed rotary movement of the shell 8, as can be seen from Figure 1, will cause the pressure screw 7 to be forced further down into the shell 8, thus wedging the drill shank tighter between the three conical clamping rollers. When the chuck is thus firmly gripping the shank of the drill there is a considerable pressure exerted by the screw 7 between the conical inner surface of the shell 8 and the ledges 13 of the housing 9. Were it not for the screw 7 thus being wedged tight the normally rotating (in the direction of arrow A) chuck could be opened and the drill therein released, by simply manually grasping and holding stationary the housing 9 of the chuck; which as will be seen from Figure 1 will cause the screw 7 to withdraw the head 3 from the conical wedging shell 8. In order to make such a manual operation for the opening of the chuck possible, it is necessary to first relieve the pressure of the screw 7 and subsequently withdraw the same from the direction of the conical shell 8.

With the above end in view I have provided a novel trigger release mechanism which is adapted to relieve the pressure of the screw 7 and to open the chuck subsequently, by a single and continuous manual operation, of grasping and holding stationary some part of the normally rotating drill chuck. This novel trigger release mechanism constituting the essence of my invention consists of the three radially movable steel balls 23, interposed between inclined surfaces of the upper beveled plate 19 and the lower beveled plate 20 which balls 23 are retained in their normal position against the component force exerted by the inclined surfaces of the beveled plates tending to move the balls radially outward by the inner cylindrical wall of an operating sleeve 25 (Figure 4) surrounding the housing 9. The sleeve 25 is capable of a slight angular movement relative to the housing 9, of an amount determined by the width of the slots 11 in said housing, into which slots extend a set of three vertically elongated projections 26, integral with said operating sleeve 25. The lugs 17 of the spring casing 16, as will be apparent from Figure 5, retain the sleeve 25 in its normal position shown in Figures 1 and 5 by the force of the spring 14. When the sleeve 25 is given a slight angular movement relative to the housing 9 in the direction of the arrow B, as when the sleeve is held stationary while the chuck is rotating in the normal direction A, the recesses 27 in the inner wall of the sleeve 25 are brought into juxtaposition to the balls 23, as shown in Figure 3. In this position the balls 23 are forced out radially into said recesses 27, by the horizontal component of the force of the pressure screw 7, thus permitting the lower or threaded beveled plate 20 to recede a slight distance towards the upper beveled plate 19 and thus relieving the pressure of the screw 7. A further relative rotation of the sleeve 25 in the direction of the arrow B (as when the sleeve is held stationary while the stem 1 continues its normal rotation in the direction of the arrow A), will carry with it the housing 9 and hence the beveled plates 19 and 20 by their mutual interlocking in the slots 11 and 12 respectively, and cause the screw 7 and hence the head 3 to be completely withdrawn from the conical wedging shell 8, thus opening up the chuck and releasing the drill clamped therein. Upon releasing the manual hold on the sleeve 25, it will again be turned by the spring 14 into the locking position shown in Figure 4, while the entire housing 9 and the beveled plates 19 and 20 will be rotated by the spring 14 in the direction of the arrow A relative to the stem 1, causing the screw 7 to feed down towards the conical shell 8 and thereby wedge the rollers 6 against the shank of any drill placed centrally of the three rollers, thus clamping the same. The above in brief is the principle and operation of my novel trigger release mechanism in a quick change drill chuck.

It will be noted from the above description and Figure 1 of the drawings, that the entire vertical force of the pressure screw 7 is transmitted from the conical inner surface of the wedging shell 8 to the ledges 13 of the housing 9 through the three steel balls 23. It has been found in practice that due to the pressure of the screw 7, as well as due to the point contact between the balls and the inclined surfaces of the beveled plates 19 and 20, the steel balls are subject to breakage causing the release mechanism to become ineffective.

With the view of alleviating the pressure on the balls 23 and hence eliminating any tendency to crush the same, I have devised a novel modified and improved construction, illustrated in Figures 9 to 16 inclusive. In this novel improved construction the vertical force between the two bevelled plates 19 and 20 exerted by the pressure screw 7, is transmitted through a split and expansible thrust collar 28, having its two faces inclined to correspond to the inclined surfaces of the beveled plates. In the normal, or locking position, the thrust collar is retained in the contracted position, shown in Figure 9, by the three steel balls 23 in the ball retaining collar 29, which balls are in turn supported by the inner cylindrical surface of the operating sleeve 25. Upon the slight angular trigger movement of the sleeve 25 relative to the housing 9, the recesses 27 are again brought into juxtaposition to the balls 23, allowing the thrust collar 28 to expand slightly and force the balls 23 out radially into the recesses 27, thus relieving the pressure of the screw 7 and permitting the withdrawal of the head 3 and the opening of the chuck as explained above. It is thus seen that in this modified and improved form of my invention, the direct vertical force of the pressure screw 7 is taken up by a thrust collar 28 capable of withstanding said vertical pressure without any possibility of fracture while only the lesser horizontal component of said vertical force necessary to effect the trigger action of the release mechanism, is borne by the steel balls 23. Otherwise the principle of construction and operation of this modified and improved form of my invention is identical with that illustrated in Figures 1 to 8 inclusive.

Having thus described my invention what I claim as new and desire to secure by Letters Patent, is:—

1. In a device of the character stated, a housing, a pressure screw therein, a plurality of clamping devices in the lower portion of said housing below said screw, means carried by said screw and bearing on said clamping devices, a tension device for said screw, a manually operated device carried by said housing, and means including radially movable locking elements, intermediate said device and screw, for first relieving the pressure of said screw and subsequently withdrawing said screw from said clamping devices to enable the latter to open.

2. In a device of the character described, a housing, a pressure screw therein, an internally conical wedging shell carried by one extremity of said housing, a plurality of conical clamping elements within said wedging shell, means carried by said screw and adapted to bear on said conical clamping elements to wedge the same in said conical shell, a correspondingly threaded element for receiving said screw, a tension device adapted to urge said screw towards said wedging shell, a manually operated sleeve carried by said housing, and releasing means including radially movable locking elements, intermediate said sleeve and screw, for first relieving the pressure of said screw and subsequently withdrawing said screw from said clamping element to enable the latter to open.

3. In an automatic chuck, a housing, an internally conical wedging shell fixed to one extremity of said housing, a plurality of conical clamping elements within said shell, a pressure screw adapted to force said clamping elements into operative engagement with said conical shell, by an angular movement relative to said housing, a correspondingly threaded collar supporting said screw, a tension device adapted to urge said screw towards said clamping elements, and manually operable releasing means for said screw, consisting of a fixed and radially beveled bearing surface carried by said housing, a corresponding movable bearing surface carried by said threaded screw supporting collar radially inclined towards said fixed bearing surface, a radially movable pressure relieving element interposed between said inclined bearing surfaces and adapted to permit the said supporting collar to approach said fixed bearing surface by a radial displacement of said pressure relieving element to thereby relieve the pressure of said screw, and a manually operable operating sleeve carried by said housing and capable of a limited angular movement with respect to said housing adapted to retain said pressure relieving element in its locking position in one angular position of the sleeve and adapted to release said element into the pressure relieving position when said sleeve is in an angular position relative to said housing removed from said first locking position.

4. In an automatic chuck comprising a housing, and a wedging clamping device including a spring actuated pressure screw, a release mechanism for opening said chuck consisting of a correspondingly threaded supporting collar for receiving said pressure screw capable of an axial movement with respect to said housing and having a bearing surface, a spring interposed between said screw and collar, a corresponding fixed bearing surface carried by said housing and inclined radially outward with respect to said movable bearing surface, a plurality of radially movable spherical pressure relieving thrust elements interposed between said inclined bearing surfaces whereby an outward radial movement of said spherical elements will permit said screw supporting collar to recede thus relieving the pressure of said screw, and an operating sleeve carried by and capable of a limited angular movement with respect to said housing, said sleeve being adapted to retain said spherical elements in their inner locking position and adapted to release said spherical elements into their outer pressure relieving position by a slight angular movement of the sleeve relative to said housing and a tension device, said sleeve being retained in said locking position by said tension device.

5. In an automatic chuck comprising a housing, and a wedging clamping device including a spring actuated pressure screw, a release mechanism for opening said chuck consisting of a correspondingly threaded supporting collar for receiving said pressure screw capable of an axial movement with respect to said housing and having a bearing surface, a corresponding fixed bearing surface carried by said housing and inclined radially outward with respect to said movable bearing surface, a radially expansible pressure relieving thrust element interposed between said inclined bearing surfaces, whereby an outward radial expansion of said thrust element will permit said supporting collar to recede, thus relieving the pressure of said screw, an operating sleeve carried by and capable of a limited angular movement with respect to said housing, a plurality of spherical thrust elements interposed between said expansible thrust element and said operating sleeve, whereby said expansible thrust element is retained in its contracted locking position, and means carried by said sleeve whereby a slight angular movement relative to said housing will permit an outward radial movement of said spherical thrust elements and hence permit the expansion of said expansible thrust element into its pressure relieving position, and a tension device adapted to retain said sleeve in its locking position relative to said housing.

WILHELM v. NEUDECK.